(12) United States Patent
Chan et al.

(10) Patent No.: US 8,666,900 B1
(45) Date of Patent: Mar. 4, 2014

(54) SECURE PRODUCT ENABLEMENT OVER CHANNELS WITH NARROW BANDWIDTH

(75) Inventors: Kwei Chan, San Diego, CA (US); John Erik Andreas Junestam, Kirkland, WA (US)

(73) Assignee: Intuit Inc., Mountain View, CA (US)

( * ) Notice: Subject to any disclaimer, the term of this patent is extended or adjusted under 35 U.S.C. 154(b) by 1816 days.

(21) Appl. No.: 11/095,046

(22) Filed: Mar. 30, 2005

(51) Int. Cl.
*G06Q 99/00* (2006.01)

(52) U.S. Cl.
USPC ............ 705/59; 705/51; 705/50; 705/76; 705/57

(58) Field of Classification Search
USPC ............ 705/26–27, 50–59, 76; 709/200, 224, 709/229; 713/156, 167; 707/1, 201; 717/174–178
See application file for complete search history.

(56) References Cited

U.S. PATENT DOCUMENTS

| | | | |
|---|---|---|---|
| 5,764,772 A * | 6/1998 | Kaufman et al. ............... 380/30 |
| 6,000,832 A * | 12/1999 | Franklin et al. ............... 700/232 |
| 6,233,565 B1 * | 5/2001 | Lewis et al. .................... 705/35 |
| 6,253,326 B1 * | 6/2001 | Lincke et al. .................. 726/12 |
| 6,347,398 B1 * | 2/2002 | Parthasarathy et al. ....... 717/178 |
| 6,442,525 B1 * | 8/2002 | Silverbrook et al. ............. 705/1 |
| 6,490,682 B2 * | 12/2002 | Vanstone et al. ............. 713/171 |
| 6,499,104 B1 * | 12/2002 | Joux .............................. 713/176 |
| 6,539,479 B1 * | 3/2003 | Wu ................................ 713/151 |
| 6,615,264 B1 * | 9/2003 | Stoltz et al. ................... 709/227 |
| 6,636,969 B1 * | 10/2003 | Jakobsson et al. ............ 713/180 |
| 6,959,291 B1 * | 10/2005 | Armstrong et al. ............. 705/59 |
| 7,024,548 B1 * | 4/2006 | O'Toole, Jr. ....................... 713/1 |
| 7,197,142 B2 * | 3/2007 | Alten ............................... 380/46 |
| 7,236,958 B2 * | 6/2007 | Wong et al. ..................... 705/59 |
| 2002/0091644 A1 * | 7/2002 | Wong et al. ..................... 705/59 |
| 2003/0039357 A1 * | 2/2003 | Alten ............................... 380/46 |
| 2003/0070069 A1 * | 4/2003 | Belapurkar et al. .......... 713/155 |
| 2004/0181672 A1 * | 9/2004 | Ferri et al. ..................... 713/176 |
| 2005/0005098 A1 * | 1/2005 | Michaelis et al. ............ 713/156 |
| 2005/0132357 A1 * | 6/2005 | Shell et al. ..................... 717/174 |
| 2005/0166263 A1 * | 7/2005 | Nanopoulos et al. ............. 726/7 |
| 2006/0150246 A1 * | 7/2006 | Kamada et al. ................. 726/17 |
| 2007/0088949 A1 * | 4/2007 | England et al. ............... 713/167 |
| 2007/0185815 A1 * | 8/2007 | Boccon-Gibod et al. ....... 705/51 |

OTHER PUBLICATIONS

"Product Activation Facts" [online], 2005, Microsoft Corporation, 13 pages [retrieved Feb. 17, 2005]. Retrieved from the Internet: <URL: http://www.microsoft.com/piracy/activation_faq.mspx>.

* cited by examiner

*Primary Examiner* — James D Nigh
(74) *Attorney, Agent, or Firm* — Park, Vaughan, Fleming & Dowler LLP (57) ABSTRACT

A system and method provide an enablement scheme that accommodates small bandwidth channels and does not rely on shared secrets between parties. This is accomplished by storing a table of messages on a vendor server and a table of hashes of the message on client machines. A process is used by the vendor to select a message from the table to use for a validation code for enablement, and an identical process is used by the client to find a corresponding hash in the hash table. By comparing the hash in the hash table to a hash of the validation code received, the client can verify the validation code. The system includes software portions for enabling the method.

42 Claims, 4 Drawing Sheets

SECURE PRODUCT ENABLEMENT OVER CHANNELS WITH NARROW BANDWIDTH

FIELD OF THE INVENTION

This invention relates generally to secure verification of product offerings, and more specifically, to secure exchange of software product validation information over channels with narrow bandwidth.

BACKGROUND

As the use of licensed software become more common, the need for secure enablement of software entitlements increases commensurate with this usage. Enablement is the process of a client acquiring proof of an entitlement to a product or service from a vendor that is needed before the product or service can be used. Enablement can take place via the Internet, telephone, or other means. For telephone enablement, a client side user, or customer, may call a vendor side customer service representative (CSR) or an interactive voice response (IVR) system. During the call, the user provides the vendor enablement information, either by reading an enablement code or punching it in to a telephone keypad, and receives back from the vendor a validation code to unlock the product or service for use.

Enablement over a telephone channel is limited to a relatively narrow bandwidth due to human involvement in the process. This narrow bandwidth limits the length of the information that can be exchanged. For example, a user cannot be expected to read or record an extraordinarily long string of digits over the phone. In addition to the inconvenience of reading or entering a long string of digits, long codes can cause data entry errors, leading to user frustration. Also, security measures may limit the number of chances a user gets for entering digits, thus locking out a user if a data entry error occurs multiple times. However, a validation code needs to meet certain security requirements to prevent piracy. Specifically, the code should be specific to an entitlement, be hard to generate by anyone but the software vendor, and depending on the circumstances, be limited to use by one or a limited group of computers. On the other hand, the validation code should be as short as possible so as not to unduly burden the person entering or reading the code over the telephone channel. Length poses a challenge because a shorter length limits the number of possible codes that a hacker needs to go through to get the correct code.

Prior security methods that aim to meet these requirements include the use of public key digital signatures or symmetric key encryption. Public key digital signatures use a pair of keys: a private key, which only the software vendor knows, and a public key, which is made publicly available. Something signed with the private key, such as a software program or unique validation code, can be verified only with the corresponding public key. This method often is used with Internet channel enablement. However, this method is not suited for enablement over channels with narrow bandwidth because public key digital signature algorithms produce code lengths of more than 78 digits at a minimal level of security.

In symmetric key encryption, the sender and receiver of messages share a single, "symmetric" key that acts as a "shared secret." The shared key is used by both the sender and receiver to encrypt and decrypt the messages. However, the security of this method is limited to the degree that the shared secret can be protected. Thus, the use of this method of enablement is undesirable because storing a shared secret on a user's computer opens the secret to anyone who can access the user's computer, which can be debugged, scrutinized, or reverse-engineered. In addition, symmetric key encryption generally requires a longer key than desired for channels with narrow bandwidth.

Accordingly, there is a need to provide a secure activation process over channels with narrow bandwidth, such as telephone channels. Preferably, the security system uses a validation code that is specific to an entitlement, is hard to generate by anyone but the software vendor, and does not rely on shared secrets between the software vendor and the user.

SUMMARY OF THE INVENTION

The present invention provides an enablement scheme that accommodates small bandwidth channels, such as telephone channels, and does not rely on shared secrets between a vendor and client. To provide this ability, messages are stored on a vendor server and hashes of the messages are stored on client machines. This process creates vendor side secrets that can be verified easily by clients by computing a hash function for the secrets. Next, a table of such messages and a corresponding table of hashes are set up. A process is used by the vendor to select a message from the table to use for a validation code for enablement, and an identical process is used by the client to find a corresponding hash in the hash table. By comparing the hash in the hash table to a hash of the validation code received, the client can verify the validation code.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Information Flow

Figure 1:
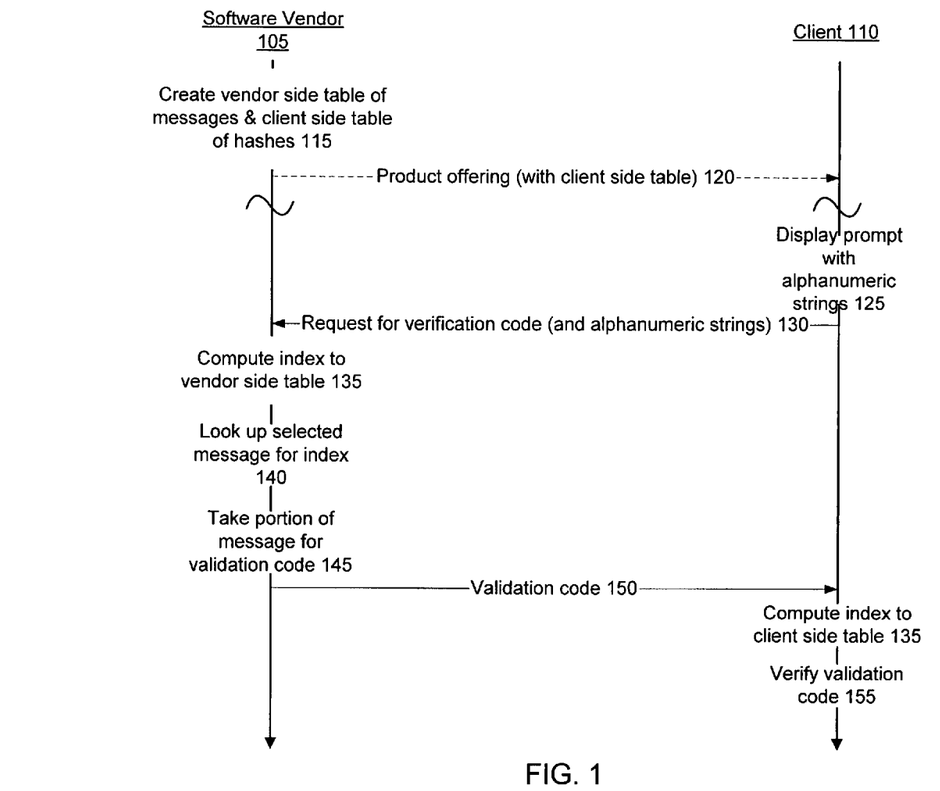
FIG. 1 is an interaction diagram illustrating the exchange of information between a software vendor and a client in conjunction with enablement according to one embodiment of the present invention.

Referring to FIG. 1, it shows an interaction diagram illustrating the exchange of information between a software vendor 105 and a client 110 in conjunction with a product validation according to one embodiment of the present invention. "Vendor," as used herein, refers to acts occurring on the software vendor side of the exchange, and may include activities performed by people, devices, or software on the vendor side. Likewise, "client," as used herein, refers to acts occurring on the client, or customer, side of the exchange, and may include activities performed by people, devices, or software on the client side.

Figure 2:
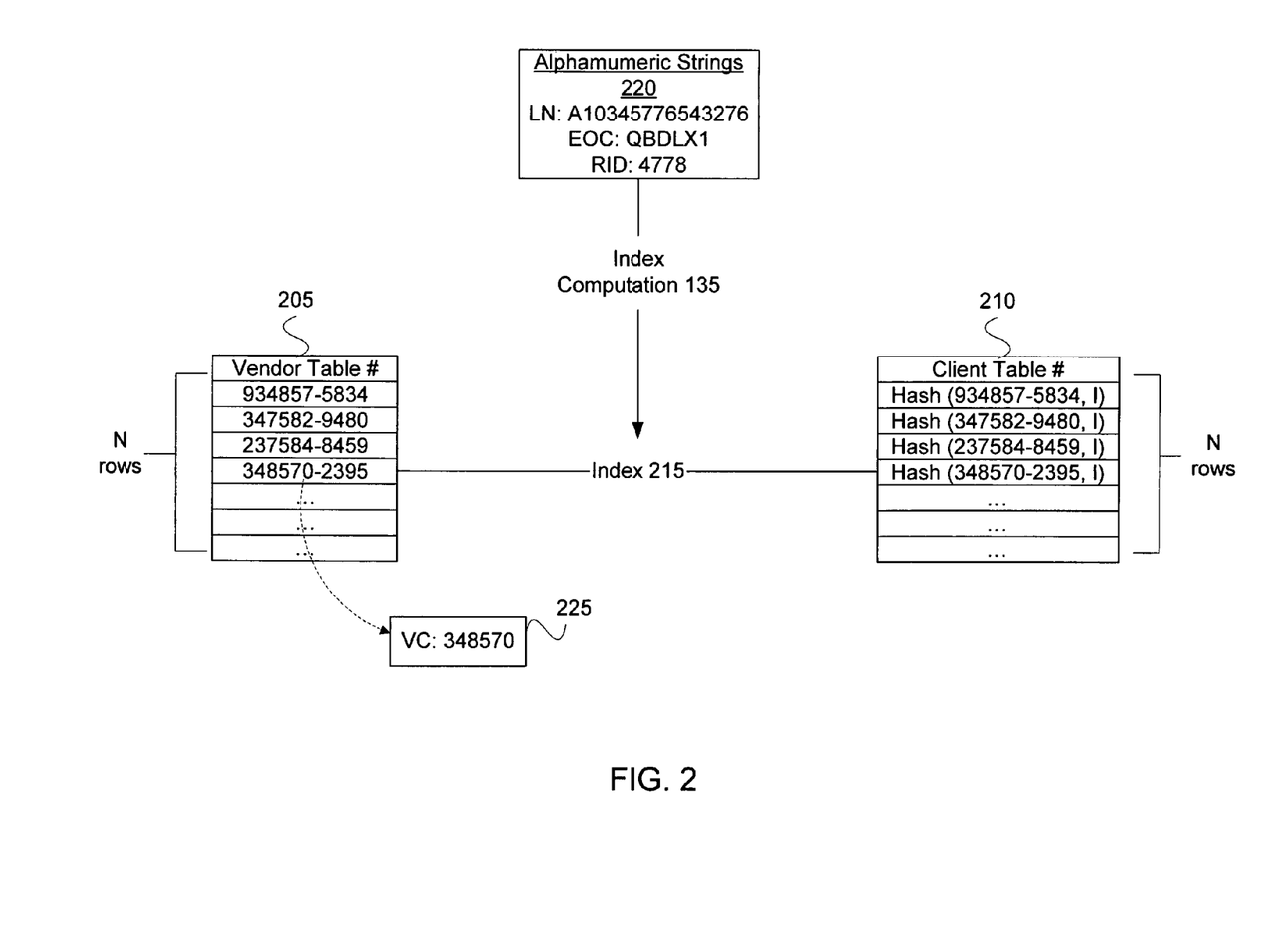
FIG. 2 is an illustration of a vendor side and client side table pair according to one embodiment of the present invention.

As a preliminary step, the software vendor 105 prepares 115 two tables. The first table is a vendor side table, which includes a listing of messages. In one embodiment, the messages are pseudorandom numbers—numbers that are not truly random, but approximate some of the properties of random numbers. A vendor side table 205 is shown in FIG. 2, which illustrates example vendor side and client side tables according to one embodiment of the present invention. In this example, the random numbers include two sets of digits, a first set of six digits and a second set of four digits. The vendor table 205 may contain a large number of rows, N, of random numbers. In one embodiment, N is $10^5$. The second table is a client side table, which includes a corresponding listing of hashes related to the vendor message table. In one embodiment, the hashes are generated from a concatenation of each of the vendor side table random numbers and a row index. Hashing is a one-way operation that generates from a starting message a fixed-size hash value in such a way that it is nearly impossible to generate the starting message from the hash. In one embodiment, the Secure Hash Algorithm-1 (SHA-1) function is used to create the hashes. An example of a client side table 210 is shown in FIG. 2. In this example, the index 215 links the vendor side 205 and client side 210 tables. This step creates N number of vendor side secrets that can be verified easily by clients by computing the hash function for a selected secret and comparing the result to the corresponding entry in the client side table.

Next, the software vendor 105 provides 120 the client 110 with a product offering, for example in the context of a software product purchase. In one embodiment, the product offering may be a software application such as discussed herein. In conjunction with the product offering, the vendor 105 provides the client 110 with the client side table. The client side table provides a mechanism for the client 110 to verify information from the vendor side table without compromising the secrecy of the vendor side table.

In one embodiment, the client 110 is required to enable the product offering before he or she is permitted to use it. Enablement is the process of a client acquiring proof of an entitlement to a product or service from a vendor, which is sufficient for the vendor to allow the client to use the product or service. Enablement may take various forms, depending on the nature of the product offering. In one embodiment, for a standard single-user software application, enablement takes the form of activation of the application using a verification code from the vendor. In another embodiment, for a product licensed with multiple seats of a predetermined number, enablement takes the form of data synchronization, which allows the client to use the predetermined number of licensed seats. Upon a first attempt to use the product offering, the application prompts the client 110 to provide the vendor 105 with information. In one embodiment, the software application displays 125 a prompt to the user including two or more strings of letters and/or numbers and instructions to provide them to the software vendor 105, referred to herein as alphanumeric strings. In some embodiments, the alphanumeric strings contain only numbers. To enable the product offering, the client 110 requests 125 a verification code from the vendor 105 and provides the alphanumeric strings. In various embodiments, the request 125 may come over various channels, for example Internet, telephone, etc. For example, a user of a client computer may make a telephone call to a customer service representative at the vendor.

In one embodiment, the alphanumeric strings that embody entitlement information include at least one string that is specific to a product entitlement and one string that is not controlled by the client 110. The use of a string that is not controlled by the client 110 prevents one type of attacks of the system in which a hacker could use the same validation code to unlock many copies of a software product as long as the same alphanumeric strings are maintained. Examples of such a string are a numeric string generated off hardware settings of client computer, a random numeric string generated per enablement, or a license number that is burned into a product CD. FIG. 2 shows an example with three alphanumeric strings 220. In the depicted example, the first string is a license number (LN) associated with the individual product, the second string is an entitlement offering code (EOC) for the product type, and the third string is a resource identification (RID). In this case, the entitlement offering code is the string that is specific to the product entitlement. The resource identification, which is a random number created and stored by the client computer in this embodiment, is the string that is not controlled by the client 110. In another embodiment, the number string may include a property identification (PID) instead of a resource identification. In yet another embodiment, the string not controlled by the client is some other aspect corresponding with the client computer hardware. This aspect of the invention provides an added measure of security to the exchange of information over narrow bandwidth channels. Because one string is not controlled by the client, it is harder for a hacker to "fake" the string; if the string is altered, the resulting validation code also will be altered and thus will not work.

In the next step, the software vendor 105 computes 135 an index to the vendor side table using the alphanumeric strings received from the client 110. In one embodiment, the vendor 105 may add one or more digits to the alphanumeric strings prior to the calculation, for example a two-digit payload (PL), which is a property value based on the alphanumeric strings received. The index calculation may take various forms. In one embodiment, a modulo function of a hash of a concatenation of the alphanumeric strings, wherein the number of rows in the table is the modulus. For example, for the alphanumeric strings 220 depicted in FIG. 2, the index 215 for enabling the product offering would be calculated as follows: Index=Mod(Hashx$10^4$(LN+EOC+RID), N). Thus, the index is a function of LN, EOC and RID. This dependency means that the resulting validation code is only valid for a particular license, for a particular product, and on a particular machine. Similarly, for a property synchronization, one example of an index calculation is: Index=Mod(Hashx$10^4$(LN+EOC+PID+PL), N). Note that PL, the property value to be synchronized, is part of the index computation. Therefore, if a user attempts to alter the property value, the resulting index will be altered, too, and validation will fail. Using hashing many times over in the index computation (ten thousand times, in the example) helps prevent some attacks on the system, as discussed further below.

Then, the vendor 105 looks up 140 the message, e.g., random number, in the vendor side table, e.g., 205 of FIG. 2, corresponding to the index calculated in the previous step. In the example depicted in FIG. 2, the index 215 aligns with "348570-2395." From the message, the vendor 105 takes 145 a portion of the message as the validation code. In one embodiment in which the message is a random number, ten digits in length, including a six digit part at the most significant digit end and a four digit part at the less significant digit end, the vendor 105 provides only the most significant six digits. The second set of digits is withheld from the client.

Thus, the second set should be long enough to add security of the scheme, but short enough for low-end client machines to handle the computation relating to the withheld digits. Using this method for the example of FIG. 2, the validation code (VC) 225 is "348570." In this example, the random number can be thought of a 348570+X, with X representing the missing digits. Validation codes should be long enough to provide security, while short enough for human users to handle. The vendor 105 then passes 150 the validation code to the client 110, using any of the channels discussed above. This aspect of the invention allows the vendor 105 to increase the number of hashings required to crack a table entry. For example, a ten-digit message requires $10^{10}$ hashing to crack a single entry in the table. However, because only a portion of the message is used as the validation code, there is no accompanying increase in the bandwidth required to communicate the code.

Once the client 110 has the validation code, the client computes 135 an index to the client side table using the same method that the vendor 105 used to compute the index to the vendor side table, and gets the hash value for the index. Using the hash value, the validation code, and the index, the client 110 can verify 155 the validation code. Using the example from FIG. 2, the verification calculation would be: hash value (from client side table)=Hash(VC+X+I); or Hash (348570-2395, I)=Hash (348570+(four digits)+Index). In this example, because the last four digits of the random number are withheld, the client 110 needs to search up to 10,000 times to find a match for which the equation is true. Assuming a match is found, the validation code is verified. This aspect of the method is advantageous because attempts to reverse engineer the client side process would not reveal the vendor side secret.

This method protects against three different known attacks. The first attack is a "fixed string" attack that fixes as many alphanumeric strings as possible and then computes possible validation codes. The second attack is a "dictionary attack," which attempts to reconstruct the entire vendor side table. The third attack is a "fixed index" attack, which focuses on a particular validation code, finds its associated entry in the table, and tries to find a combination of alphanumeric strings such that the index computation remains the same. In the following analyses, it is assumed that each entry in vendor side table is a ten-digit random number, the first six digits of which become the validation code.

Using the example from above for each of these attacks, an evaluation can be made of the security of the method. For the fixed string attack, the fact that one string is not controlled by the client makes it very hard to compute a validation code. By setting the number of strings that are not controlled by the client at $10^4$, this attack requires $10^{10} \times 10^4$ ($10^{14}$) hashing. Assuming a computer can run through $10^5$ hashing per second, it would take the computer about 31 years to finish the hack.

In a dictionary attack, the hacker compares the hash values of every ten-digit number for a match to the server table. For each entry, it would take a $10^{10}$ hash and $10^{10} \times \log_2(N)$ comparisons to accomplish this. Note that this is substantially less than the fixed string attack, and that it would accomplish a crack of the entire table. However, because an additional (unique) number (e.g., I, the row index) is concatenated to each random number before it is hashed, then each entry has to be solved individually, requiring substantially larger effort. Specifically, the hashing needed jumps to $10^{10} \times$ table size, which for table size of $10^5$ is $10^{15}$.

In order to carry out the fixed index attack, the hacker starts with a known hash from the client side. Then, focusing on a particular validation code, he finds its associated entry in the table. Then he tries to find a combination of alphanumeric strings such that the index computation remains the same. If all such numerical string combinations are found, then the same validation code will work for each. However, by setting the number of possible strings not controlled by the client at $10^4$, the effort required for finding all such pairs would be $10^9$ assuming a standard (one time) hash. However, because the hashing is carried out $10^4$ times in this example (see example index computation, above), the cost of carrying out this attack is $10^{13}$ hashing. Thus, the method is secure against all three known attacks.

System Architecture

Figure 3:
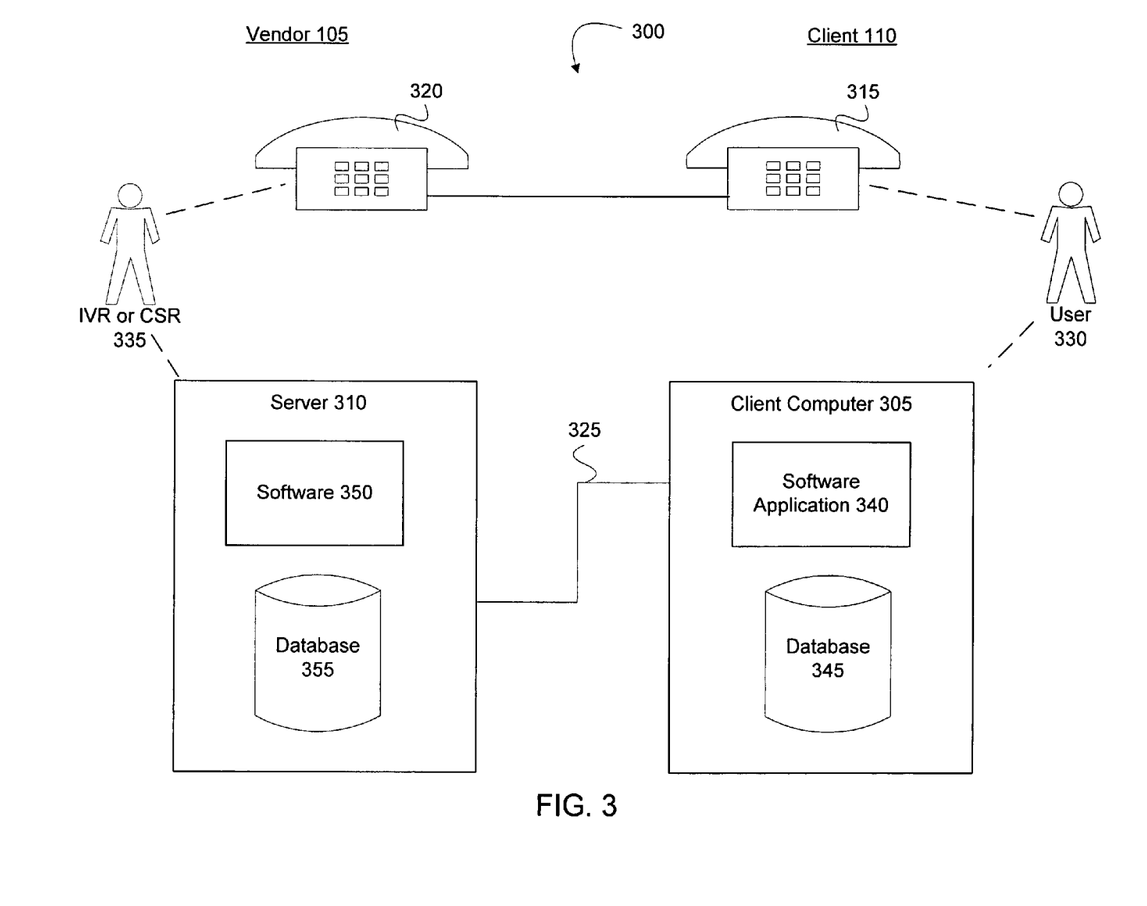
FIG. 3 is an illustration of the architecture of a system useful for secure enablement over channels with narrow bandwidth according to one embodiment of the present invention.

Referring now to FIG. 3, there is shown an illustration of the architecture of a system 300 useful for secure enablement over channels with narrow bandwidth according to one embodiment of the present invention. In such a system, there is provided one or more client computers 305, one or more servers 310, and one or more client telephones 315 communicatively coupled to one or more vendor telephones 320.

The client computer 305 is of conventional design, and includes a processor, an addressable memory, and other conventional features (not illustrated) such as a display, a local hard disk, and input/output ports. In embodiments in which the client computer 305 includes a network interface, it provides access to the network 325 and other computers, such as server 310 or financial institution computer systems (not shown), along with access to the Internet, via a TCP/IP type connection, or to other network embodiments, such as a WAN, LAN, MAN or the like. In the preferred embodiment the client computer 305 may be implemented on an Intel-based computer operating under Microsoft Windows XP, Windows 2000, or Windows NT operating system, or a SPARC-based computer operating under UNIX, or any other equivalent devices.

Similar to the client computer 305, the server 310 may be of conventional design, and can include a standard processor, a computer-readable memory, and a network interface. The network interface and a network communication protocol provide access to the network 325 and other computers, such as client computer 305 or financial institution computer systems (not shown), along with access to the Internet, via a TCP/IP type connection, or to other network embodiments, such as a WAN, LAN, MAN or the like. The server 310, depicted as a single computer system, may be implemented as a network of computer processors.

Client telephone 315 may be any standard or voice over internet protocol (VOIP) telephony system that allows a user 330 of the client computer 305 to call the software vendor 105. Likewise, the vendor telephone 320 may be any standard or voice over internet protocol (VOIP) telephony system that allows a customer service representative (CSR) or interactive voice response (IVR) 335 associated with the server 310 to receive a call from the client 110. In other embodiments, wireless transmission means such as wireless telephony are used. In still further embodiments, narrow bandwidth channels other than telephone replace the telephones in the depicted embodiment.

In one embodiment, the client computer 305 further comprises a software application 340 and a database 345. The software application 340 includes a number of executable code portions and data files for enabling a product offering received by a client from a vendor, as described further in conjunction with FIG. 4. These include code for creating and supporting the software application 340 functionality. The software application 340 may be provided to the client computer 305 on a computer readable media, such as a CD-ROM, diskette, or by electronic communication over the network 325 from the server 310 or other distributors of software, for installation and execution thereon.

The database 345 may be a conventional database accessible by the application 340 through a conventional communications interface. The database 345 is configured for storing information relating to various aspects of software application 340 execution, for example storage of data input by the user 330 or storage of a client side table. The application 340 accesses and queries the database 345 to retrieve data records associated with the software application 340.

In one embodiment, the server 310 further comprises software 350 and a database 355. The software 350 includes a number of executable code portions and data files for enabling a product offering a product offering received by a client from a vendor, as described further in conjunction with FIG. 5. These include code for creating and supporting the software 350 functionality.

The database 355 may be a conventional database accessible by the software 350. The database 355 is configured for storing information relating to various aspects of software 350 execution, for example storage of data for the vendor side table. The software 350 accesses and queries the database 355 to retrieve data records associated with the software 350.

One skilled in the art will recognize that the system architecture illustrated in FIG. 3 is merely exemplary, and that the invention may be practiced and implemented using many other architectures and environments.

Software Architecture

Figure 4:
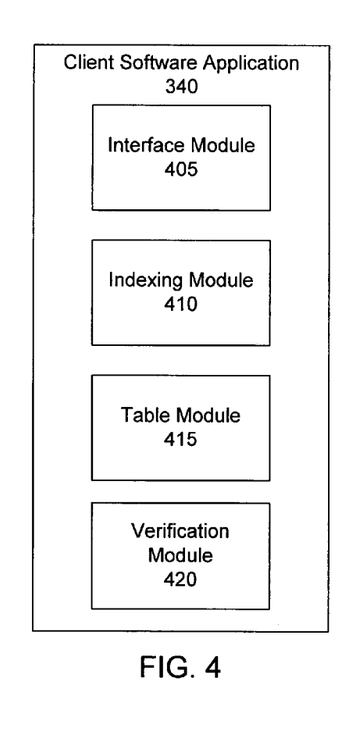
FIG. 4 is a block diagram illustrating a client side software architecture for the method of FIG. 1 according to one embodiment of the present invention.

Referring now to FIG. 4, it is a block diagram illustrating a client side software architecture for the method of FIG. 1 according to one embodiment of the present invention. The software application 340 includes a number of executable code portions and data files, including an interface module 405, an indexing module 410, a table module 415, and a verification module 420.

The interface module 405 executes logic for displaying to a client a user interface including a plurality of alphanumeric strings and a prompt to provide the strings to the software vendor. In addition, the interface module 405 executes logic for receiving client input including a validation code for the product offering.

The indexing module 410 executes logic for computing an index to a client side table using the plurality of strings. For example, the indexing module 410 may execute logic for computing a modulo function of a hash of the concatenated alphanumeric strings, wherein the number of rows in the table is the modulus.

The table module 415 executes logic for maintaining a client side table. In one embodiment, the client side table includes hashes associated with a table of vendor side secrets.

The verification module 420 executes logic for verifying the validation code, using the validation code and the index to the client side table. In one embodiment, the verification module 420 executes logic for computing a hash of a concatenation of the validation code, unknown additional digits, and an index to the client side table and comparing the hash to a client side table hash corresponding to the index.

The above software portions 405-420 need not be discrete software modules. The configuration shown is merely an example; other configurations are anticipated by and within the scope of the present invention.

Figure 5:
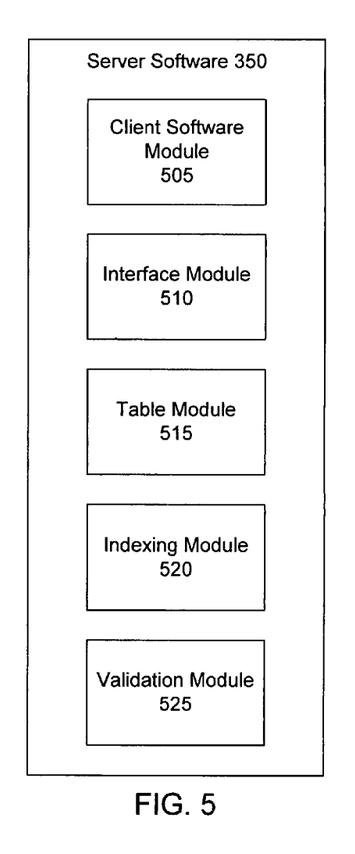
FIG. 5 is a block diagram illustrating a vendor side software architecture for the method of FIG. 1 according to one embodiment of the present invention.

Referring now to FIG. 5, it is a block diagram illustrating a vendor side software architecture for the method of FIG. 1 according to one embodiment of the present invention. The software 350 includes a number of executable code portions and data files, including a client software module 505, an interface module 510, a table module 515, an indexing module 520, and a validation module 525.

The client software module 505 executes logic for inserting the client side table into the client software application, creating the client software application itself, and/or sending the application to the client.

The interface module 510 executes logic for displaying a user interface for receiving user (CSR or IVR) input including a plurality of alphanumeric strings and for displaying to a user a validation code for the product offering.

The table module 515 executes logic for creating a vendor side table of messages, such as random numbers and for creating a client side table of hashes associated with the messages.

The indexing module 520 executes logic for computing an index to a vendor side table using the plurality of alphanumeric strings. In one embodiment, the indexing module 520 executes logic for computing a modulo function of a hash of a concatenation of the concatenated alphanumeric strings, wherein the number of rows in the table is the modulus. The validation module 525 executes logic for generating a validation code. In one embodiment, the validation module 525 executes logic for looking up a selected message from the vendor side table and taking a portion of the message for the validation code.

The above software portions 505-525 need not be discrete software modules. The configuration shown is merely an example; other configurations are anticipated by and within the scope of the present invention.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may include a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for enabling a product offering received by a client from a vendor, the method comprising:
   in a computer system at the client:
   providing to the vendor a plurality of alphanumeric strings;
   computing an index to a client side table using the plurality of strings;
   receiving from the vendor a validation code for the product offering; and
   verifying the validation code using the validation code and the index to the client side table.

2. The method of claim 1, wherein the alphanumeric strings are provided to a client via a user interface associated with the product offering.

3. The method of claim 1, wherein a first string of the plurality is specific to the product offering and a second string of the plurality is not controlled by the client.

4. The method of claim 3, wherein the second string is a resource identification.

5. The method of claim 1, wherein the client side table comprises hashes associated with a table of vendor side secrets.

6. The method of claim 5, wherein the vendor side secrets are random numbers and each hash is generated from a concatenation of one of the random numbers and the index to the client side table.

7. The method of claim 1, wherein computing the index further comprises executing a modulo function of a hash of a concatenation of the alphanumeric strings, wherein the number of rows in the client side table is the modulus for the modulo function.

8. The method of claim 1, wherein the validation code is a portion of a selected secret from a table of vendor side secrets, the selected secret determined by the alphanumeric strings.

9. The method of claim 8, wherein the selected secret is a random number selected from the table of vendor side secrets by computing an index to the table of vendor side secrets.

10. The method of claim 1, wherein verifying the validation code further comprises:
    computing a hash of a concatenation of the validation code, unknown additional digits, and the index to the client side table; and
    comparing the hash to a client side table hash corresponding to the index.

11. The method of claim 1, wherein the client side table is provided to the client with the product offering.

12. A method for enabling a product offering received by a client from a vendor, the method comprising:
    in a computer system at the client:
    downloading the product offering from a vendor, the product offering including a client side table;
    providing to the vendor a plurality of alphanumeric strings;
    computing an index to the client side table using the plurality of strings;
    receiving from the vendor a validation code for the product offering; and
    verifying the validation code using the validation code and the index to the client side table.

13. A method for enabling a product offering received by a client from a vendor, the method comprising:
    in a computer system at the vendor:
    receiving from the client a plurality of alphanumeric strings;
    computing an index to a vendor side table using the plurality of alphanumeric strings, the vendor side table comprising vendor side secrets; and
    providing to the client a validation code for the product offering, the validation code generated from a selected vendor side secret.

14. The method of claim 13, wherein a first string of the plurality is specific to the product offering and a second string of the plurality is not controlled by the client.

15. The method of claim 14, wherein the second string is a resource identification.

16. The method of claim 13, wherein computing the index further comprises executing a modulo function of a hash of a concatenation of the alphanumeric strings, wherein the number of rows in the vendor side table is the modulus for the modulo function.

17. The method of claim 13, wherein the vendor side secrets are random numbers, each of the random numbers comprising a first set of digits and a second set of digits.

18. The method of claim 17, wherein the validation code is the first set of digits.

19. The method of claim 17, wherein the product offering includes a client side table of hashes, each hash generated from a concatenation of one of the random numbers and the index to the client side table.

20. The method of claim 13, wherein the selected vendor side secret is determined by computing an index to the vendor side table using the numerical string.

21. A computer program product for enabling a product offering received by a client from a vendor, comprising:
 a non-transitory computer-readable medium; and
 computer program code, coded on the medium, that, when executed by a computer system in a client, cause the computer system in the client to:
 display to the client a plurality of alphanumeric strings;
 compute an index to a client side table using the plurality of strings;
 receive client input comprising a validation code for the product offering; and
 verify the validation code using the validation code and the index to the client side table.

22. The computer program product of claim 21, wherein a first string of the plurality is specific to the product offering and a second string of the plurality is not controlled by the client.

23. The computer program product of claim 21, wherein the client side table comprises hashes associated with a table of vendor side secrets.

24. The computer program product of claim 23, wherein the vendor side secrets are random numbers and each hash is generated from a concatenation of one of the random numbers and the index to the client side table.

25. The computer program product of claim 21, wherein computing the index further comprises executing a modulo function of a hash of a concatenation of the alphanumeric strings, wherein the number of rows in the client side table is the modulus for the modulo function.

26. The computer program product of claim 21, wherein the validation code is a portion of a selected secret from a table of vendor side secrets, the selected secret determined by the alphanumeric strings.

27. The computer program product of claim 26, wherein the selected secret is a random number selected from the table of vendor side secrets by computing an index to the table of vendor side secrets.

28. The computer program product of claim 21, wherein verifying the validation code further comprises:
 computing a hash of a concatenation of the validation code, unknown additional digits, and the index to the client side table; and
 comparing the hash to a client side table hash corresponding to the index.

29. The computer program product of claim 21, wherein the client side table is provided to the client with the product offering.

30. A system for enabling a product offering received by a client from a vendor, the system comprising:
 a computer system at the client configured to:
 display to the client a plurality of alphanumeric strings;
 compute an index to a client side table using the plurality of strings;
 receive client input comprising a validation code for the product offering; and
 verify the validation code using the validation code and the index to the client side table.

31. The system of claim 30, wherein the computer system at the client is further configured to maintain a client side table.

32. The system of claim 31, wherein the client side table is comprised of hashes associated with a table of vendor side secrets.

33. The system of claim 32, wherein the vendor side secrets are random numbers and each hash is generated from a concatenation of one of the random numbers and the index to the client side table.

34. The system of claim 30, wherein, when computing the index, the computer system at the client is configured to:
 execute a modulo function of a hash of a concatenation of the alphanumeric strings, wherein the number of rows in the client side table is the modulus for the modulo function.

35. The system of claim 30, wherein, when verifying the validation code, the computer system at the client is configured to:
 compute a hash of a concatenation of the validation code, unknown additional digits, and the index to the client side table; and
 compare the hash to a client side table hash corresponding to the index.

36. The system of claim 35, wherein the client side table is provided to the client with the product offering.

37. A system for enabling a product offering received by a client from a vendor, the system comprising:
 a computer system at the client configured to:
 download the product offering from a vendor, the product offering including a client side table;
 display to the client a plurality of alphanumeric strings;
 compute an index to the client side table using the plurality of strings;
 receive client input comprising a validation code for the product offering; and
 verify the validation code using the validation code and the index to the client side table.

38. A system for enabling a product offering received by a client from a vendor, the system comprising:
 a computer system at the vendor configured to:
 receive user input comprising a plurality of alphanumeric strings;
 compute an index to a vendor side table using the plurality of alphanumeric strings, the vendor side table comprising vendor side secrets; and
 display to a user a validation code for the product offering, the validation code generated from a selected vendor side secret.

39. The system of claim 38, wherein the computer system at the vendor is further configured to:
 create the vendor side table and a client side table of hashes.

40. The system of 39, wherein the hashes are associated with the vendor side table.

41. The system of 38, wherein the computer system at the vendor is further configured to:
 generate a validation code.

42. The system of 41, wherein the vendor side secrets are random numbers, each of the random numbers comprising a first set of digits and a second set of digits, and the validation code is the first set of digits.

* * * * *